United States Patent
Kaikkonen

(10) Patent No.: US 12,452,148 B2
(45) Date of Patent: Oct. 21, 2025

(54) METHOD OF DETERMINING A BIT LENGTH OF AN IQ SAMPLE

(71) Applicant: Siemens Industry Software Inc., Plano, TX (US)

(72) Inventor: Jaakko Kaikkonen, Oulu (FI)

(73) Assignee: Siemens Industry Software Inc., Plano, TX (US)

( * ) Notice: Subject to any disclaimer, the term of this patent is extended or adjusted under 35 U.S.C. 154(b) by 66 days.

(21) Appl. No.: 18/288,572

(22) PCT Filed: Apr. 27, 2021

(86) PCT No.: PCT/IB2021/053450
§ 371 (c)(1),
(2) Date: Oct. 26, 2023

(87) PCT Pub. No.: WO2022/229669
PCT Pub. Date: Nov. 3, 2022

(65) Prior Publication Data
US 2024/0205114 A1  Jun. 20, 2024

(51) Int. Cl.
*H04L 43/062* (2022.01)
*H04L 43/022* (2022.01)
(Continued)

(52) U.S. Cl.
CPC .......... *H04L 43/022* (2013.01); *H04L 43/062* (2013.01)

(58) Field of Classification Search
CPC ... H04L 43/022; H04L 43/062; H04L 43/026; H04W 88/085; H04W 92/12
See application file for complete search history.

(56) References Cited

U.S. PATENT DOCUMENTS

| | | | |
|---|---|---|---|
| 8,005,152 B2 * | 8/2011 | Wegener | H03M 7/40 375/150 |
| 8,320,433 B2 | 11/2012 | Wegener | |

(Continued)

FOREIGN PATENT DOCUMENTS

EP  2281373 A2  2/2011

OTHER PUBLICATIONS

O-Ran Alliance; O-Ran Fronthaul Working Group; "Control, User and Synchronization Plane Specification"; Aug. 2, 2019 pp. 1-218, XP009527536.

(Continued)

*Primary Examiner* — Kamal M Hossain
(74) *Attorney, Agent, or Firm* — Lempia Summerfield Katz LLC

(57) ABSTRACT

A method of determining a bit length of an IQ sample associated with a first data frame is provided. The method includes determining a first parameter associated with a payload length of the first data frame, and determining a second parameter indicative of a number of physical resource blocks in the first data frame. A presence of a compression header is detected based on the first parameter and the second parameter, and the bit length of the IQ sample is determined from one of the detected compression header and the first parameter and the second parameter. The bit length of the IQ sample may be determined automatically from information available in the data frame. This eliminates the need for manual entry of parameters into the packet analyzer and eliminates the likelihood of errors to due incorrect entry.

16 Claims, 3 Drawing Sheets

(51) Int. Cl.
*H04L 43/026* (2022.01)
*H04W 8/08* (2009.01)
*H04W 92/12* (2009.01)

(56) References Cited

U.S. PATENT DOCUMENTS

| | | |
|---|---|---|
| 8,331,461 B2 | 12/2012 | Wegener |
| 8,705,634 B2 | 4/2014 | Wegener |
| 9,240,803 B2 | 1/2016 | Wegener |
| 2011/0135013 A1 | 6/2011 | Wegener |
| 2011/0280209 A1 | 11/2011 | Wegener |
| 2012/0008696 A1 | 1/2012 | Wegener |
| 2012/0014421 A1 | 1/2012 | Wegener |
| 2012/0014422 A1 | 1/2012 | Wegener |
| 2012/0250740 A1 | 10/2012 | Ling |
| 2023/0180055 A1* | 6/2023 | Gorain .................. H04W 28/06 370/329 |

OTHER PUBLICATIONS

PCT International Preliminary Report of Patentability of International Preliminary Examining Authority mailed Jun. 14, 2023 corresponding to PCT International Application No. PCT/IB2021/053450; 14 pp.
PCT International Search Report and Written Opinion of International Searching Authority mailed Jan. 20, 2022 corresponding to PCT International Application No. PCT/IB2021/053450; 16 pp.
Written Opinion of the International Preliminary Examining Authority mailed Mar. 29, 2023 corresponding to PCT International Application No. PCT/IB2021/053450; 7 pp.

* cited by examiner

METHOD OF DETERMINING A BIT LENGTH OF AN IQ SAMPLE

This application is the National Stage of International Application No. PCT/IB2021/053450, filed Apr. 27, 2021. The entire contents of this document are hereby incorporated herein by reference.

BACKGROUND

The current disclosure relates to network analysis and, more particularly, relates to analysis of data packets. With the adoption of distributed base station architecture, base stations may be deployed by integrating various devices from different vendors. For example, a distributed unit of a base station may be from one vendor, and radio units of the corresponding base station may be from another vendor. However, due to this possibility of integration, there may be situations where the base station does not perform as expected due to incorrect configuration of the distributed unit or the radio units.

SUMMARY AND DESCRIPTION

The scope of the present invention is defined solely by the appended claims and is not affected to any degree by the statements within this summary.

The current disclosure relates to network analysis, such as analysis of packets between a distributed unit and at least one radio unit of a base station. With the adoption of distributed base stations and 5G new radio technologies, modern day base stations are no longer monolithic and are divided into three major components: central unit, distributed unit, and radio unit. The central unit processes non-real time protocols and services, and the distributed unit processes physical level protocols and latency-critical real time services. The radio unit(s) carry out link layer and physical layer signal processing when transmitting and receiving radio signals. Accordingly, this allows for development and deployment of base stations with components from different vendors. However, due to this, it is important to provide that the configurations of the various components are compatible with each other to provide that the base station is operating correctly. One such way of evaluating this is via analysis of live packets transmitted between the distributed unit and the radio units. This may be performed using packet sniffers and analyzers.

Packet sniffers and analyzers are used to intercept or capture packets mid transmission between the distributed unit and the radio units, and then utilize these packets to perform network analysis. However, to be able to correctly parse and interpret the packets, the packet analyzer requires information about packet format. This is particularly relevant to IQ data frames as defined in Open Radio Access Networks (ORAN) specifications. The IQ data frame includes a plurality of optional parameters that may or may not be present in the data frame. Similarly, the length of the IQ sample may be set between 6-16 bits and therefore may not be known to the packet analyzer. Determining the bit length of the IQ sample is important to verify the configurations of the distributed unit and the radio unit. Conventionally, this is provided to the packet analyzer manually and there, is subject to human error. Additionally, in some circumstances, this information may not be known and accordingly may not be provided to the packet analyzer.

Accordingly, there is a need for a method and packet analyzer that automatically determines the bit length of the IQ sample.

Accordingly, the current disclosure describes a method of determining a bit length of an IQ sample associated with a first data frame. The method includes determining a first parameter associated with a payload length of the first data frame, determining a second parameter indicative of a number of physical resource blocks in the first data frame, detecting a presence of a compression header based on the first parameter and the second parameter, and determining the bit length of the IQ sample from the detected compression header, or the first parameter and the second parameters. Accordingly, in accordance with the above method, the bit length of the IQ sample may be determined automatically from the information available in the data frame. Accordingly, this eliminates the need for manual entry of parameters into the packet analyzer and additionally eliminates the likelihood of errors to due incorrect entry.

In an example, the method includes determining a presence of compression parameter based on the first parameter and the second parameter. Accordingly, by using the first parameter and the second parameter, the presence of the optional parameters such as user data compression header and the user data compression parameter may be determined. Accordingly, this allows for improved analysis of the intercepted packets.

In an example, determining the bit length of the IQ sample from the detected compression header, or the first parameter and the second parameter includes extracting a value of the bit length of the IQ sample from the detected compression header. Accordingly, when the compression header is detected, the value of the bit length of IQ sample is not calculated but rather extracted from the compression header.

In an example, the method is implemented by a packet analyzer device that is configured to intercept one or more data frames transmitted between a distributed unit and a radio unit. The one or more intercepted data frames includes the first data frame.

In an example the method further includes comparing a value of the second parameter against a predefined value and modifying the value of the second parameter based on the comparison. The value of the second parameter is modified based on the sub carrier spacing and the bandwidth frequency associated with the first data frame. In certain cases, where the number of physical resource blocks in a packet is greater than 255, the value of the second parameter in the first data frame is set to zero prior to transmission. Accordingly, when such a data frame is intercepted, the value of the second parameter is checked to see if the value is equal to zero or not. If the value is zero, the packet analyzer modifies this value to indicate the actual number of physical resource blocks based on the sub carrier spacing and the bandwidth frequency associated with the first data frame.

In another aspect, the current disclosure describes a packet analyzer device capable of determining a bit length of an IQ sample associated with a first data frame. The packet analyzer device includes a network interface capable of intercepting one or more data frames transmitted between a distributed unit and at least one radio unit, and one or more processors connected to a memory module. The one or more processors are configured to determine a first parameter associated with a payload length of the first data frame, determine a second parameter indicative of a number of physical resource blocks in the first data frame, detect a presence of a compression header based on the first parameter and the second parameter, and determine the bit length of the IQ sample from the detected compression header, or the first parameter and the second parameter. In an example, the one or more processors are further configured to determine a presence of compression parameter based on the first parameter and the second parameter. In another example, the one or more processors are configured to extract a value of the bit length of the IQ sample from the compression header upon detecting the presence of the compression header. In yet another example, the one or more processors are further configured to compare a value of the second parameter against a predefined value and modify the value of the second parameter based on the comparison. The value of the second parameter is modified based on the sub carrier spacing and the bandwidth frequency associated with the first data frame.

In yet another aspect, the current disclosure describes a non-transitory storage medium for determining a bit length of an IQ sample associated with a first network frame. The non-transitory storage medium includes a plurality of instructions that, when executed on one or more processors, cause the one or more processors to determine a first parameter associated with a payload length of the first data frame, determine a second parameter indicative of a number of physical resource blocks in the first data frame, detect a presence of a compression header based on the first and second parameters, and determine the bit length of the IQ sample from the detected compression header, or the first parameter and the second parameter. The advantages of the method apply to the device and the non-transitory storage medium described herein. These aspects are further described in relation FIGS. 1-4.

DETAILED DESCRIPTION

Figure 1:
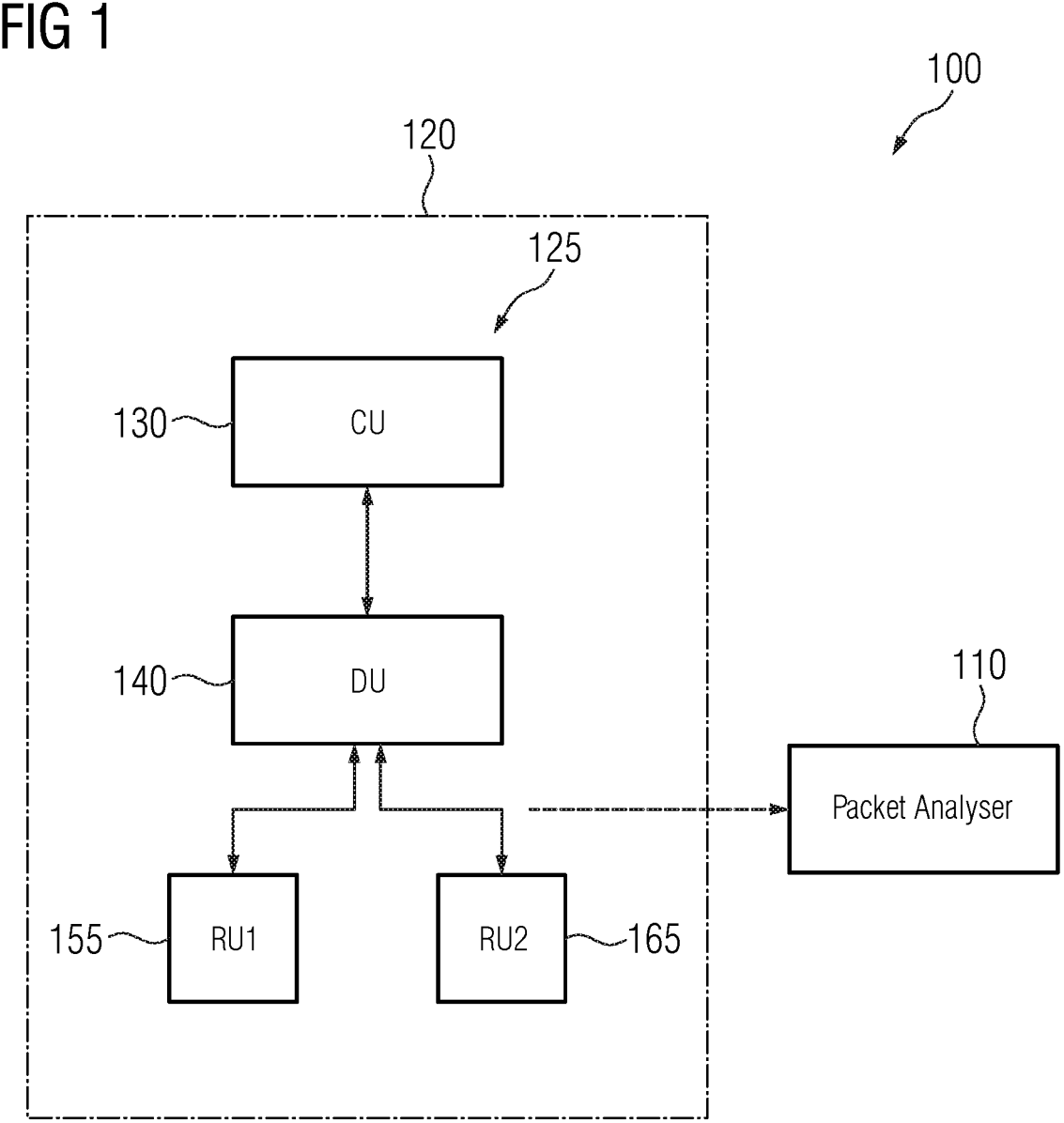
FIG. 1 illustrates an example system incorporating a packet analyzer device for intercepting and analyzing data frames between a distributed unit and a radio unit.

FIG. 1 illustrates an example system 100 incorporating a packet analyzer device 110 for intercepting and analyzing data frames. The example system 100 includes a base station 120. The base station 120 may be connected to a cellular network (not shown in FIG. 1) including other base stations and the network core. In an example, the base station 120 may be a part of a radio access network of a wireless communication system (e.g., a cellular communication system). The wireless communication system may operate according to specifications of a Universal Mobile Telecommunication System or any one of its evolution versions (e.g., Long-Term Evolution (LTE) or LTE-Advanced), a second-generation mobile telecommunication system such as Global System for Mobile Communications, or a system operating strictly on unlicensed frequency bands. An example of a system operating on the unlicensed bands is IEEE 802.11 (Wi-Fi) and, as a consequence, the base station may be considered broadly as an access point providing a terminal device with wireless access to other networks such as the Internet.

The base station 120 includes a central unit (CU) 130, one or more distributed units (shown in FIG. 1 as distributed unit 140), and one or more radio units (shown in FIG. 1 as radio units 155, 165). The central unit 130 and the distributed unit (DU) 140 may be jointly referred to as baseband unit (BBU). The central unit 130 processes non-real time protocols and services, and the distributed unit 140 processes physical level protocols and latency-critical real time services. The radio units (RU 155 and RU 165) carry out link layer and physical layer signal processing when transmitting and receiving radio signals. The connections between the various radio units (e.g., elements 155, 165 and the distributed unit 140 are based on ethernet and focus on various aspects in relation to the radio units such as antenna data, beamforming control, management, and synchronization. Examples of protocols used between the distributed unit 140 and the radio units (e.g., elements 155 and 165) include O-RAN with eCPRI or IEEE1914.3 (RoE) as antenna data transport layer and optional UDP over IPv4 or IPv6 as the routable transport layer, etc.

The packet analyzer device 110 (e.g., including one or more processors) is configured to intercept or capture one or more data frames or packets between the distributed unit 140 and at least one of the radio units (e.g., elements 155 and 165). The packet analyzer device 110 processes the captured data frames to perform network analysis. The packet analyzer device 110 is configured to determine a bit length of an IQ sample in a first data frame from the one or more captured data frames. Based on the bit length of the IQ sample in the first data frame, the packet analyzer device 110 may check if the configuration between the distributed unit 140 and the radio units (e.g., elements 155 and 165) is correct. Additionally, the packet analyzer device 110 is configured to parse the IQ data in the first data frame based on the determined bit length. These aspects in relation to the determination of the bit length of the IQ sample are further explained in the description of FIG. 2.

Figure 2:
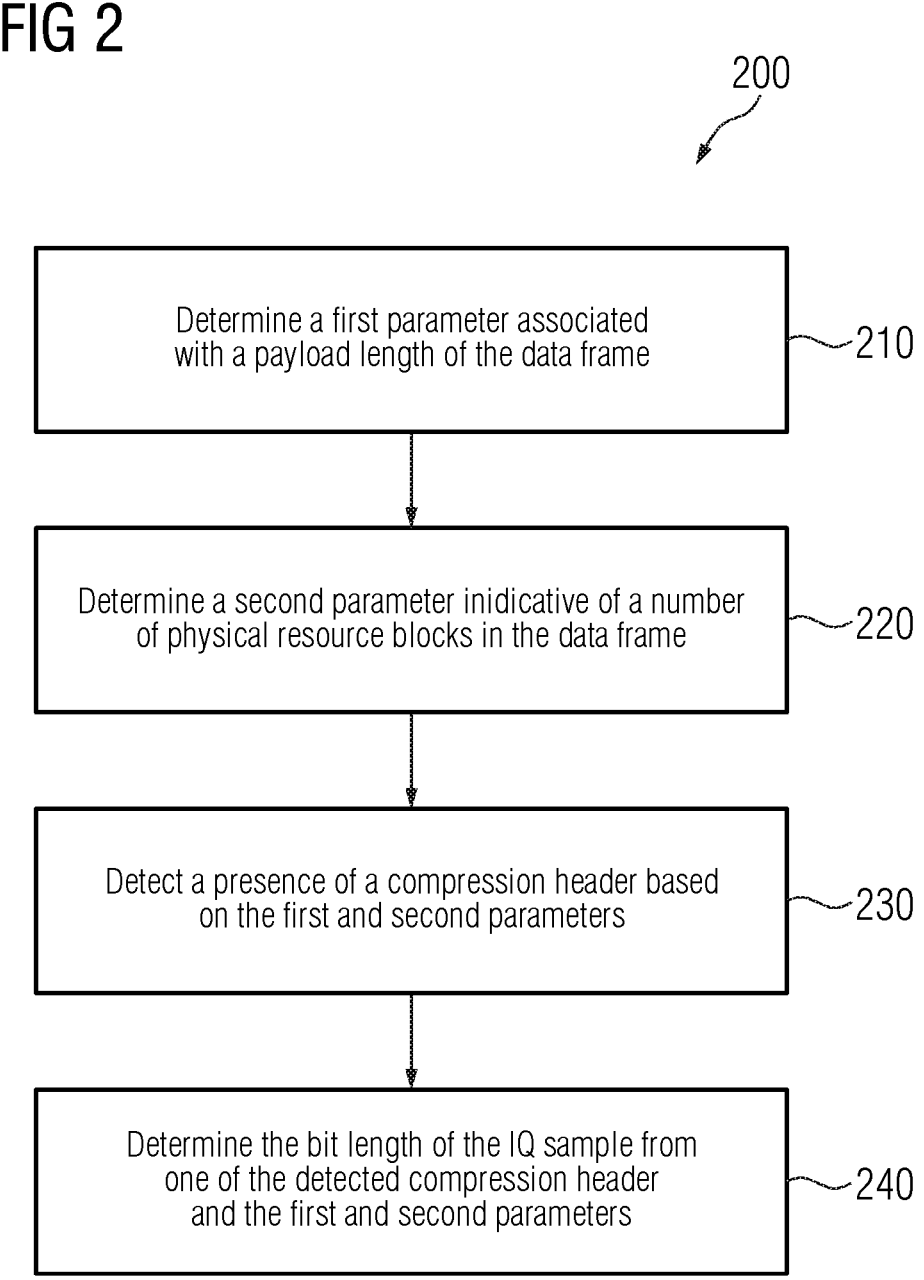
FIG. 2 illustrates an example method of determining a bit length of an IQ sample associated with a first data frame.

FIG. 2 illustrates one embodiment of a method 200 of determining a bit length of an IQ sample associated with a first data frame. The first data frame is transmitted over the user plane between the distributed unit 140 and the radio units (e.g., elements 155 and 165) and is used for transmitting IQ data (e.g., I data and Q data). Accordingly, the first data frame includes I and Q data. A bitlength of the IQ data is unknown to the packet analyzer 110. The first data frame is based on eCPRI specifications on the transport layer and on ORAN specifications on the application layer. In other words, the application layer payload is based on IQ data format as mentioned ORAN specifications, and this is wrapped in the transport layer payload, which is in accordance with the eCPRI specifications. Accordingly, the first data frame includes fields as mentioned in the eCPRI and ORAN specifications.

In an example, the method 200 is implemented by the packet analyzer device 110. At act 210, the packet analyzer device 110 determines a first parameter associated with a payload length of the first data frame. In an example, the first parameter is provided in a header of the first data frame. For example, the data frame is based on Common Public Radio Interface (eCPRI) interface specifications. The payload length (also referred to as payload size) in specified in a common header in accordance with the eCPRI specifications.

Figure 3:
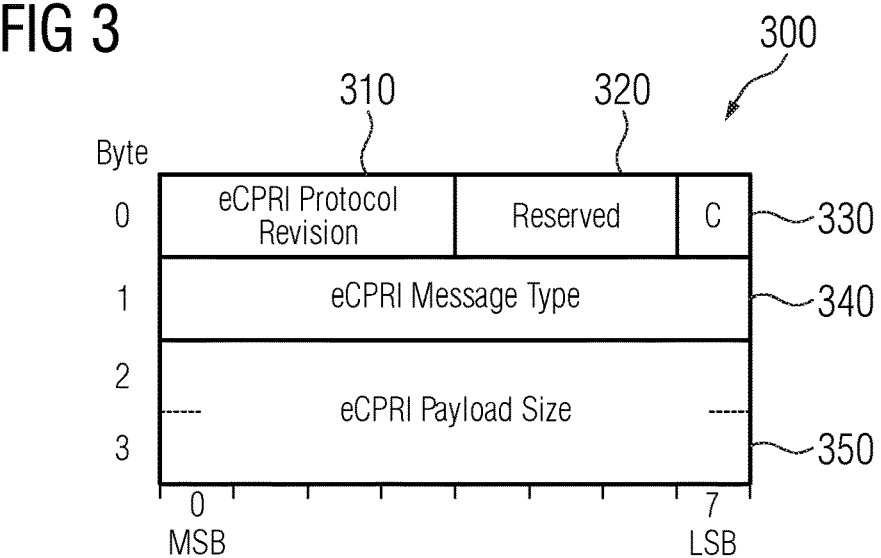
FIG. 3 illustrates an example eCPRI common header data format.

An example eCPRI common header format 300 is illustrated in FIG. 3. The eCPRI common header format 300 includes a eCPRI protocol revision parameter 310 indicative of protocol version, reserved section 320 that includes one or more reserved bits in accordance to the eCPRI specifications, an eCPRI messages concatenation indicator 330, a eCPRI message type parameter 340 that indicates a type of services conveyed by the data frame, and a eCPRI payload size parameter 350 that indicates the size in bytes of the payload part corresponding to the data frame. The eCPRI common header format 300 does not include any padding bytes.

Then, at act 220, the packet analyzer device 110 determines a second parameter indicative of a number of physical parameter (indicative of number of physical resource blocks)). Accordingly, when the above condition is met, the value of the counter is reflective of the bit length of the IQ sample. Additionally, in certain cases, the IQ data may also include a compression parameter and accordingly, 1 byte is subtracted from the division of the first parameter by the second parameter prior to comparing the same with the value of the iteratively calculated multiple. This is illustrated using the logic provided below:

```
For 'counter' 6 to 16
    If ('counter' * 2 * 12) / 8 == First parameter / Second Parameter
        bitlengthIQ = counter
        No CompressionParameter detected
    Else if (('counter' * 2 * 12) / 8)+1 == First parameter/ Second parameter
        bitlengthIQ = counter
        CompressionParameter detected
    Endif
Endfor
``` resource blocks in the first data frame. In an example, the second parameter is provided in the first data frame. For example, the data frame is based on ORAN IQ data frame format as specified in the ORAN specifications. Accordingly, in an example, the number of physical data blocks is provided as variable numPRBu of size 1 byte in the sixteenth octet of the data frame.

Then, at act 230, the packet analyzer device 110 detects a presence of a compression header based on the first parameter and the second parameter. For example, the packet analyzer performs a modulo operation on the first parameter indicative of the payload size of the data frame, using the second parameter indicative of the number of physical resource blocks in the data frame, to check if the payload size is a multiple of the number of physical resource blocks. If the module operation returns a zero (e.g., the payload size is a multiple of the number of physical resource blocks), then there are no extra bytes, and accordingly, the packet analyzer 110 determines that no compression header is present. However, if the module operation returns a reminder (e.g., the payload size is not a multiple of the number of physical resource blocks), then, the packet analyzer 110 determines that there is a compression header in the data frame.

Then, at act 240, the packet analyzer device 110 determines the bit length of the IQ sample from the detected compression header, or the first parameter and the second parameter. In an example, where the presence of the compression header is detected in the data frame, the bit length (also referred to as bit width) of the IQ sample may be read or extracted from the compression header. As mentioned previously, the data frame is based on ORAN IQ data frame format as specified in the ORAN specifications, and accordingly, the compression header is present in the seventeenth octet of the data frame.

In an example, where there is no compression header, the bit length of the IQ sample is calculated from the first parameter and the second parameters. In an example, since the bit length is between 6-16 bits, the bit length is determined by iteratively calculating a multiple of a counter (which is increased by 1 each iteration), 2 (for I and Q data), 12 (since there are 12 IQ samples per physical resource block), dividing the result by 8 (to convert the result into bytes and compare the final result to a division of the first parameter (indicative of payload length) by the second Accordingly, using the above method 200, the bitlength (also referred to as bit width) of the IQ sample of the first data frame may be determined automatically, without any manual intervention. The determined bitlength may be used in subsequent network analysis of the first data frame. In an example, the determined bit length may be used to check the configuration of the distributed unit and to verify if the bitlength as set in the configuration of the distributed unit matches with the bitlength as determined from the first data frame by the packet analyzer. Similarly, determined bitlength may be used to check the configuration of the radio unit and to verify if the bitlength as set in the configuration of the radio unit matches with the bitlength as determined from the first data frame by the packet analyzer. In another example, based on the determined bitlength, the actual I data and Q data (IQ data) may be parsed by the packet analyzer.

Based on the above method, the presence of compression parameter may be determined using the first parameter and the second parameter as shown above. In an example, the value of the second parameter may not be reflective of the actual number of the physical resource blocks in the data frame. For example, in accordance with the ORAN specifications, when the number of physical resource blocks is greater than 255, the value of the second parameter is set to zero (e.g., by either the distributed unit or the radio unit). Accordingly, the packet analyzer device checks if the value of the second parameter as determined from the first data frame is equal to zero (e.g., a predefined value). Then, if the value of the second parameter is zero, the packet analyzer device 110 modifies the value of the second parameter, based on the sub carrier spacing and the bandwidth frequency associated with the first data frame. In an example, the packet analyzer 110 includes a look up table including a list of number of physical resource block values index against values of sub carrier spacing and the bandwidth frequency. Accordingly, based on the sub carrier spacing and the bandwidth frequency, the packet analyzer 110 device determines a value of number of physical resource block. For example, when the bandwidth frequency is 100 Mz and sub carrier spacing is 30 kHz, the packet analyzer 110 device replaces the value of the second parameter with the value 273.

While the above method 200 is explained in relation to packet analyzer device 110, the above method may be realized in another device or a plurality of devices. For example, the method 200 may be implemented in a network management device or a network analyzer that is configured to receive one or more data frames captured by a packet capture service. Accordingly, the present disclosure may take a form of a computer program product including program modules accessible from computer-usable or computer-readable medium storing program code for use by or in connection with one or more computers, processing units, or instruction execution system.

Figure 4:
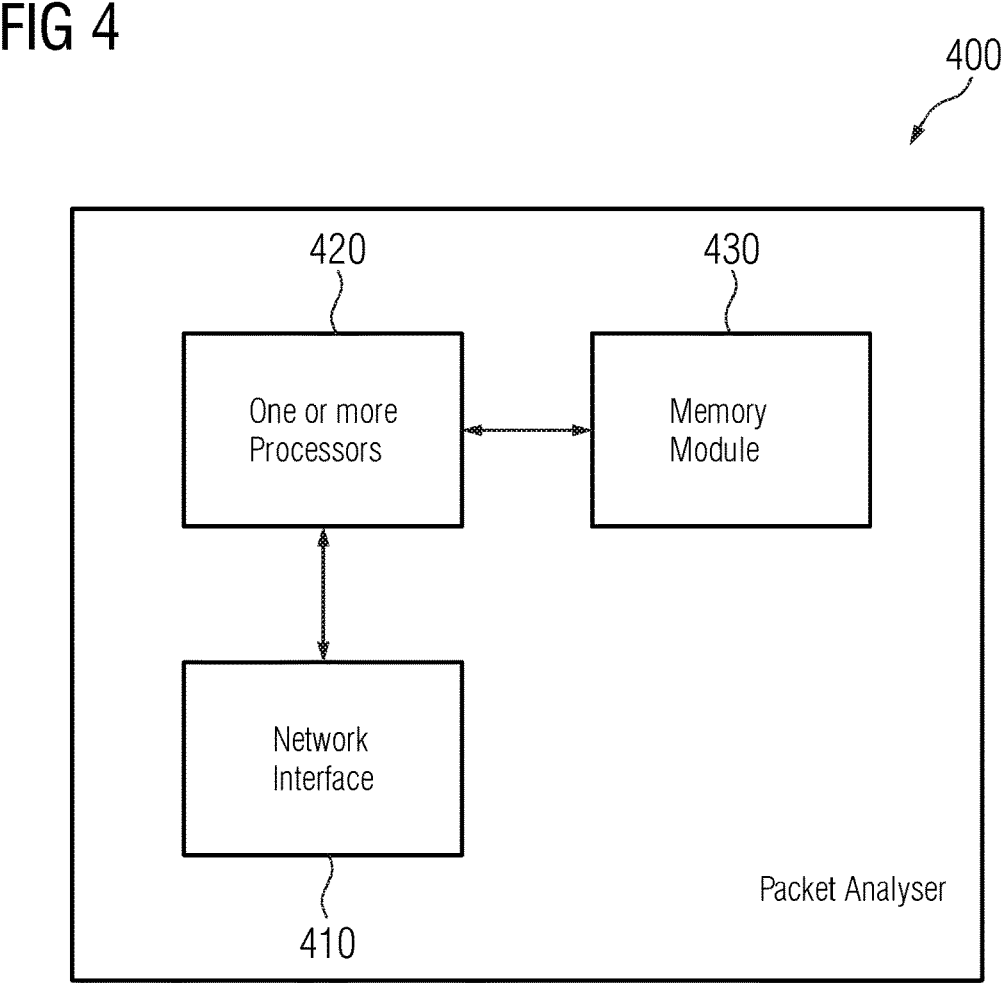
FIG. 4 illustrates an example packet analyzer device capable of determining a bit length of an IQ sample associated with a first data frame.

Accordingly, the current disclosure describes a packet analyzer device 400 as shown in FIG. 4. The packet analyzer device 400 is capable of or configured to determine a bitlength of an IQ sample associated with a first data frame. The packet analyzer device 400 including a network interface 410 operable to intercept or capture one or more data frames transmitted between a distributed unit and at least one radio unit. The packet analyzer device 400 further includes one or more processors 420 connected to a memory module 430. The memory module 430 (also referred to as non-transitory storage medium 430) includes a plurality of instructions that, when executed on the one or more processors 320, cause the one or more processors 420 to determine a first parameter associated with a payload length of the first data frame, determine a second parameter indicative of a number of physical resource blocks in the first data frame, detect a presence of a compression header based on the first parameter and the second parameter, and determine the bit length of the IQ sample from the detected compression header, or the first parameter and second parameter. The above-mentioned description in relation to method 200 applies to the determination of the bit length by the one or more processors 420 mentioned here.

In an example, the one or more processors 420 are further configured to determine a presence of compression parameter based on the first parameter and the second parameter. In another example, the one or more processors 420 are configured to extract a value of the bit length of the IQ sample from the compression header upon detecting the presence of the compression header. In another example, the one or more processors 420 are further configured to compare a value of the second parameter against a predefined value and modify the value of the second parameter based on the comparison. The value of the second parameter is modified based on the sub carrier spacing and the bandwidth frequency associated with the first data frame.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or a semiconductor system (or apparatus or device), or propagation mediums in and of themselves as signal carriers are not included in the definition of physical computer-readable medium; the physical computer-readable medium may include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of determining a bit length of an IQ sample associated with a first data frame, the method comprising:
    capturing one or more data frames between a distributed unit and a radio unit by a packet analyzer, the bit length of the IQ sample being unknown to the packet analyzer;
    determining a first parameter associated with a payload length of the first data frame;
    determining a second parameter indicative of a number of physical resource blocks in the first data frame;
    detecting a presence of a compression header based on the first parameter and the second parameter, the detecting of the presence of the compression header comprising performing, by the packet analyzer, a modulo operation on the first parameter indicative of a payload size of the first data frame, using the second parameter indicative of the number of physical resource blocks in the first data frame, to check if the payload size is a multiple of the number of physical resource blocks;
    determining the bit length of the IQ sample from the detected compression header, or the first parameter and the second parameter; and
    verifying whether the bit length as set in the configuration of the radio unit, the distributed unit, or the radio unit and the distributed unit matches with the bit length as determined from the first data frame by the packet analyzer,
    wherein the determined bit length of the IQ sample of the first data frame is used for checking a configuration of the distributed unit or the radio unit.

2. The method of claim 1, further comprising determining the bit length of the IQ sample in the first data frame from the one or more data frames.

3. The method of claim 1, wherein when, based on the performing of the modulo operation, the modulo operation returns a zero, then there are no extra bytes, and the packet analyzer determines that no compression header is present, and
    wherein when, based on the performing of the modulo operation, the modulo operation returns a remainder, then the packet analyzer determines that there is a compression header in the first data frame.

4. The method of claim 1, further comprising determining the presence of the compression parameter based on the first parameter and the second parameter.

5. The method of claim 1, wherein determining the bit length of the IQ sample from the detected compression header, or the first parameter and the second parameter comprises extracting a value of the bit length of the IQ sample from the detected compression header.

6. The method of claim 1, wherein the method is implemented by a packet analyzer device,
wherein the packet analyzer is configured to intercept the one or more data frames transmitted between the distributed unit and the radio unit, and
wherein the one or more data frames includes the first data frame.

7. The method of claim 1, further comprising comparing a value of the second parameter against a predefined value and modifying the value of the second parameter based on the comparing,
wherein the value of the second parameter is modified based on a sub carrier spacing and a bandwidth frequency associated with the first data frame.

8. The method of claim 1, further comprising parsing, by the packet analyzer, the IQ sample associated with the first data frame based on the determined bit length.

9. A packet analyzer device operable to determine a bit length of an IQ sample associated with a first data frame, the packet analyzer device comprising:
a network interface configured to capture one or more data frames between a distributed unit and a radio unit, the bit length of the IQ sample being unknown to the packet analyzer; and
a processor configured to:
determine a first parameter associated with a payload length of the first data frame;
determine a second parameter indicative of a number of physical resource blocks in the first data frame;
detect a presence of a compression header based on the first parameter and the second parameter, the detection of the presence of the compression header comprising performance, by the packet analyzer, of a modulo operation on the first parameter indicative of a payload size of the first data frame, using the second parameter indicative of the number of physical resource blocks in the first data frame, to check if the payload size is a multiple of the number of physical resource blocks; and
determine the bit length of the IQ sample from the detected compression header, or the first parameter and the second parameter; and
verify whether the bit length as set in the configuration of the radio unit, the distributed unit, or the radio unit and the distributed unit matches with the bit length as determined from the first data frame by the packet analyzer,
wherein the determined bit length of the IQ sample of the first data frame is used for checking a configuration of the distributed unit or the radio unit.

10. A non-transitory computer-readable storage medium that stores instructions executable by one or more processors to determine a bit length of an IQ sample associated with a first network frame, the instructions comprising:
capturing one or more data frames between a distributed unit and a radio unit by a packet analyzer, the bit length of the IQ sample being unknown to the packet analyzer;
determining a first parameter associated with a payload length of the first data frame;
determining a second parameter indicative of a number of physical resource blocks in the first data frame;
detecting a presence of a compression header based on the first parameter and the second parameter, the detecting of the presence of the compression header comprising performing, by the packet analyzer, a modulo operation on the first parameter indicative of a payload size of the first data frame, using the second parameter indicative of the number of physical resource blocks in the first data frame, to check if the payload size is a multiple of the number of physical resource blocks; and
determining the bit length of the IQ sample from the detected compression header, or the first parameter and the second parameter; and
verifying whether the bit length as set in the configuration of the radio unit, the distributed unit, or the radio unit and the distributed unit matches with the bit length as determined from the first data frame by the packet analyzer,
wherein the determined bit length of the IQ sample of the first data frame is used for checking a configuration of the distributed unit or the radio unit.

11. The non-transitory computer-readable storage medium of claim 10, wherein the instructions further comprise determining the bit length of the IQ sample in the first data frame from the one or more data frames.

12. The non-transitory computer-readable storage medium of claim 10, wherein when, based on the performing of the modulo operation, the modulo operation returns a zero, then there are no extra bytes, and the packet analyzer determines that no compression header is present, and
wherein when, based on the performing of the modulo operation, the modulo operation returns a remainder, then the packet analyzer determines that there is a compression header in the first data frame.

13. The non-transitory computer-readable storage medium of claim 10, wherein the instructions further comprise determining the presence of the compression parameter based on the first parameter and the second parameter.

14. The non-transitory computer-readable storage medium of claim 10, wherein determining the bit length of the IQ sample from the detected compression header, and the first parameter and the second parameter comprises extracting a value of the bit length of the IQ sample from the detected compression header.

15. The non-transitory computer-readable storage medium of claim 10, wherein the determination of the bit length of the IQ sample associated with the first network frame is implemented by a packet analyzer device,
wherein the packet analyzer is configured to intercept the one or more data frames transmitted between the distributed unit and the radio unit, and
wherein the one or more data frames includes the first data frame.

16. The non-transitory computer-readable storage medium of claim 10, wherein the instructions further comprise comparing a value of the second parameter against a predefined value and modifying the value of the second parameter based on the comparing,
wherein the value of the second parameter is modified based on a sub carrier spacing and a bandwidth frequency associated with the first data frame.

* * * * *